May 7, 1935. J. JONES Re. 19,562

MASK FOR FOWLS

Original Filed Jan. 7, 1933

Inventor

J. Jones

By Watson E. Coleman

Attorney

Reissued May 7, 1935 Re. 19,562

UNITED STATES PATENT OFFICE 19,562

MASK FOR FOWLS

Jacob Jones, Woodinville, Wash., assignor of forty-nine per cent to J. Clayton Cridlebaugh, Woodinville, Wash.

Original No. 1,962,395, dated June 12, 1934, Serial No. 650,721, January 7, 1933. Application for reissue July 12, 1934, Serial No. 734,857

11 Claims. (Cl. 119—97)

This invention relates to a mask or shield which is adapted to be worn by a fowl so as to prevent fighting or disturbance of other fowl by the fowl without interfering with the freedom in eating, breathing or the like of the fowl.

An object of this invention is to provide a mask or guard which is so constructed that it can be readily worn on the beak of the fowl in a position to prevent the fowl from injuring other fowl positioned directly in front thereof and which is so constructed that it will not be unduly cumbersome in the wearing or will not cause soreness resulting in serious injury to the fowl.

A further object of this invention is to provide a device of this kind which is adapted to engage the beak of the fowl at the rear portion of the beak and to be fastened to the beak by means extending through the breather openings in the rear portion of the beak.

The above and various other objects and advantages of this invention will in part be described and in part be understood from the following detailed description of the present preferred embodiment, the same being illustrated in the accompanying drawing wherein:—

Referring to the drawing wherein like numerals of reference designate corresponding parts throughout the views, the letter H designates the head of a fowl provided with a beak B and in the present instance, this fowl is shown as a chicken or the like.

Figure 1:
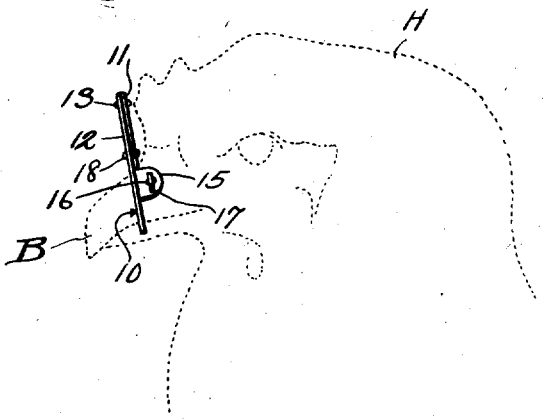
Figure 1 is a detail side elevation of a device constructed according to the preferred embodiment of this invention showing the device in mounted position on the beak of a fowl.
Figure 2:
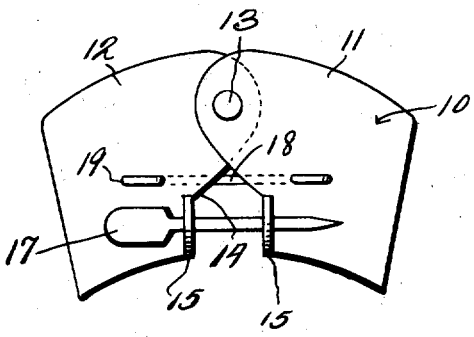
Figure 2 is a detail rear elevation of the device.
Figure 3:
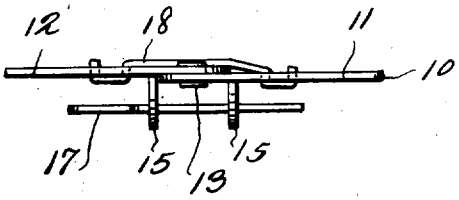
Figure 3 is a detail top plan view of the device.

In order to prevent the fowl or chicken from fighting and also to quiet nervous hens of the type which lays eggs regularly, I have provided a mask or guard, generally designated as 10, which comprises two complementary plates 11 and 12, which are pivoted together, as at 13. The upper edges of these plates 11 and 12 are curved and the inner edges of the plates 11 and 12 overlap each other and are cut out, as at 14, so as to permit the receiving of the beak B therein.

This mask or shield 10 is adapted to be positioned at a point closely adjacent the forward portion of the head H and at the rear of the beak B, and each plate 11 and 12 is provided with a rearwardly extending lug 15 which is disposed at substantially a right angle to the plane of the plates and which is adapted to closely lie against the side of the beak B.

Each lug 15 is provided with an aperture 16 therethrough and a securing means in the form of a pin 17 is adapted to extend through the alined holes 16 and also through the breather openings in the beak B. The pin 17 is adapted to have a head on one end and the opposite end may be suitably bent so that once the shield or mask 10 is positioned on the beak B, it will not be readily lost. In its application the pin 17 passes through the membrane separating the breather ducts.

The plates 11 and 12 are constantly urged toward each other by means of an elastic or resilient member 18 which is positioned above the lugs 15 and in the present instance, this resilient or elastic tightening member 18 is constructed in the form of a piece of rubber which has each end thereof threaded through openings 19 provided in the plates 11 and 12.

In the use of this device, the mask or shield 10 is initially opened a sufficient distance to permit positioning of the beak B within the cut out portion 14 provided between the two plates 11 and 12, and the lugs 15 are positioned with the openings 16 alining with the breather openings in the beak B. The pin or securing member 17 is then passed through the openings 16 and one end portion of the pin 17 may then be bent so that it will not be lost. In this position, the mask or shield 10 is mounted in upstanding position on the beak B and will be maintained in this position so as to prevent the fowl from fighting inasmuch as the fowl cannot see directly ahead of it and in this way, a relatively heavy laying hen may have one of these masks or guard members mounted on its beak and as it cannot see directly ahead of it when it is sitting on the nest, it will remain there quietly. This device may be worn at all times by the fowl and due to its extreme lightness of construction and the fact that there are no binding elements connected therewith to prevent the fowl from eating, the fowl will soon become accustomed to the wearing of the device.

The pin or securing member 17 also serves as a pivot upon which the mask may swing and which is of especial advantage in the event the mask or guard 10 should become caught on any obstruction. Under such condition the mask or guard 10 will readily swing forward as the fowl endeavors to effect a release. As the mask or guard 10 swings forwardly the contact of the opposed edges of the plates 11 and 12 and above the lugs 15 with the upper surface of the beak of the fowl will result in an outward swinging movement of the plates 11 and 12 placing the member 18 under such tension that when the mask or guard is released from the stress or strain effecting the downward swinging movement of the mask or guard, the retraction of the member 18 will pull the plates 11 and 12 inwardly and against the beak of the fowl with the result that the mask or guard 10 will be automatically swung back to its normal position as illustrated in Figure 1 of the drawing. It is also this pressure of the opposed edges of the plates 11 and 12 upon the beak B that maintains the guard or mask in its normal position. In practice, the location of the band 18 is such that when the mask or guard is swung forwardly and downwardly from its normal position the central part of the member 18 contacts with or rests upon the upper surface of the beak and remains stationary, the increasing tension of the member 18 being from said point in opposite directions from the beak. The member 18 allows a relatively outward swinging movement of the plates 11 and 12 sufficient to permit the mask or guard 10 to be swung forwardly and downwardly a considerable distance.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A mask for fowl comprising two plates, means for pivoting the plates together, means for securing the plates on the beak of a fowl in upstanding position, and yieldable means constantly urging the plates together.

2. A mask as set forth comprising a relatively flat guard having a beak receiving opening, a rearwardly extending lug on each side of the opening and means engaging the lugs and the upper portion of the beak for securing the guard to the beak of a fowl in upstanding position.

3. A mask as set forth comprising two plate members, means for pivotally securing the plate members together, said plate members having a beak receiving cut out portion, a lug carried by each plate on the inner edge thereof, and means engaging the lugs to secure the plates in upstanding position on the beak of the fowl.

4. A mask as set forth comprising two flat members having a cut out inner edge portion to receive the upper portion of a beak, means above the cut out portion of each member to pivotally secure the members together, yieldable means engaging each member to constantly urge the members toward each other and into contacting relation with a beak, an apertured lug carried by each member and extending at a right angle to the member and engaging against the side of the beak, and a securing means extending through the aperture of each lug and through the beak to maintain the members in upstanding relation to the beak and forwardly of the eyes of the fowl to prevent forward vision of the fowl.

5. A mask for fowls comprising a member to straddle the beak of a fowl with the member normally extending upwardly from the beak, said member having portions to lap the side portions of the beak at the rear part thereof, and a member extending through said lapped portions and the beak of the fowl to pivot the device to the beak.

6. A mask for fowls comprising a member to be positioned from above upon the beak of a fowl with the member normally extending upwardly from the beak, said member having portions to lap the side portions of the beak at the rear part thereof, and a member extending through said lapped portions and the beak of the fowl to hold the device to the beak, said first named member being adapted to swing on the second named member if the first named member engages an obstacle.

7. A mask for fowls comprising a member to be positioned upon the beak of a fowl with the member normally extending upwardly from the beak, and a pivot member engaged with the first named member and passing through the beak of the fowl to hold the member in place upon the beak and to allow the member to have swinging movement.

8. A mask for fowls comprising a member to be positioned upon the beak of a fowl and normally extending upwardly therefrom, said member having portions to lap the side portions of the beak at the rear part thereof, and a pivot member extending through said lapped portions and the beak of the fowl.

9. A mask for fowls comprising a guard having a beak receiving portion in its lower part, a lug on each side of said beak receiving portion, and means engaging the lugs and the beak for securing the guard to the beak with the guard normally upwardly disposed from the beak.

10. A mask for fowls comprising a guard having a beak receiving portion in its lower part, a lug on each side of said beak receiving portion, and means engaging the lugs and the beak for securing the guard to the beak with the guard normally upwardly disposed from the beak, said means comprising an elongated member passing through the membrane separating the breather ducts in the beak.

11. A mask for fowls comprising a guard having a beak receiving cut-out portion in its lower part, lugs carried by the guard at opposite sides of said cut-out portion, and means to be carried by the beak for coaction with the lugs to pivotally hold the guard upon the beak with the guard normally upwardly disposed from the beak.

JACOB JONES.